United States Patent
Akiyama (10) Patent No.: US 10,067,414 B2
(45) Date of Patent: Sep. 4, 2018

(54) WAVELENGTH CONVERSION ELEMENT, LIGHT SOURCE APPARATUS, AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/805,823

(22) Filed: Nov. 7, 2017

(65) Prior Publication Data

US 2018/0149954 A1    May 31, 2018

(30) Foreign Application Priority Data

Nov. 28, 2016    (JP) .................................. 2016-229802

(51) Int. Cl.
*G03B 21/20*    (2006.01)
*G03B 21/16*    (2006.01)

(52) U.S. Cl.
CPC ............ *G03B 21/204* (2013.01); *G03B 21/16* (2013.01); *G03B 21/208* (2013.01); *G03B 21/2066* (2013.01); *G03B 21/2073* (2013.01)

(58) Field of Classification Search
CPC ...... G03B 21/204; G03B 21/14; G03B 21/16; F21S 2/00; F21V 9/00; F21V 9/08; F21Y 101/02
See application file for complete search history.

(56) References Cited

U.S. PATENT DOCUMENTS

| | | | | |
|---|---|---|---|---|
| 5,164,580 A | * | 11/1992 | Funada | .................... H01L 31/12 250/208.1 |
| 2013/0250546 A1 | * | 9/2013 | Hu | ............................ F21V 9/40 362/84 |

FOREIGN PATENT DOCUMENTS

| | | |
|---|---|---|
| JP | 2012-169049 A | 9/2012 |
| JP | 2014-192127 A | 10/2014 |

* cited by examiner

*Primary Examiner* — Danell L Owens
(74) *Attorney, Agent, or Firm* — Oliff PLC (57) ABSTRACT

A wavelength conversion element according to an aspect of the invention includes a wavelength conversion layer having a light incident surface on which excitation light is incident and a light exiting surface that faces away from the light incident surface and a cooler including a support member that supports the wavelength conversion layer and a light transmissive member that has a curved surface that protrudes in the direction opposite the direction in which the excitation light travels, faces the light incident surface of the wavelength conversion layer, and is bonded to the support member via a bonding member. An air layer provided between the light incident surface of the wavelength conversion layer and the light transmissive member, and the air layer is thinner than the bonding member.

19 Claims, 6 Drawing Sheets

WAVELENGTH CONVERSION ELEMENT, LIGHT SOURCE APPARATUS, AND PROJECTOR

BACKGROUND

1. Technical Field

The present invention relates to a wavelength conversion element, a light source apparatus, and a projector.

2. Related Art

JP-A-2012-169049 discloses a light source apparatus including an excitation light source that radiates excitation light, an optical system that collects the excitation light, a phosphor on which the collected excitation light is incident and which is excited with the incident excitation light to radiate fluorescence, and a glass substrate on which the phosphor is formed. In the configuration described above, the phosphor is formed on one side of the glass substrate, and a cooling mechanism formed of a heat sink is provided on the one side (excitation light incident side) of the glass substrate, whereby the phosphor can be efficiently cooled. In the light source apparatus disclosed in JP-A-2012-169049, since cooling fins are formed on the excitation light incident side (the one side of the glass substrate) of the cooling mechanism, no light transmissive member can be provided on the excitation light incident side.

In a case where a light transmissive member having high thermal conductivity or a light transmissive member that excels in heat dissipation (light transmissive member made of sapphire, for example) is provided on the excitation light incident side of a wavelength conversion layer, an adhesive used to bond the light transmissive member to the light incident surface of the wavelength conversion layer needs to have light transparency, high heat resistance, and a refractive index ranging from 1.76 (refractive index of light transmissive member) to 1.83 (refractive index of wavelength conversion layer). An adhesive that satisfies the conditions described above is, however, not available.

SUMMARY

An advantage of some aspects of the invention is to provide a wavelength conversion element, a light source apparatus, and a projector that allow a light transmissive member to be provided on the light incident surface of a wavelength conversion layer in a satisfactory manner and is capable of suppressing reflection at the interface between the wavelength conversion layer and the light transmissive member, improving heat dissipation performance, and suppressing decrease in wavelength conversion efficiency.

A wavelength conversion element according to an aspect of the invention includes a wavelength conversion layer having a light incident surface on which excitation light is incident and a light exiting surface that faces away from the light incident surface and a cooler including a support member that supports the wavelength conversion layer and a light transmissive member that has a curved surface that protrudes in a direction opposite a direction in which the excitation light travels, faces the light incident surface of the wavelength conversion layer, and is bonded to the support member via a bonding member. An air layer is provided between the light incident surface of the wavelength conversion layer and the light transmissive member, and the air layer is thinner than the bonding member.

According to the aspect of the invention, the air layer provided between the wavelength conversion layer and the light transmissive member allows suppression of interface reflection with light transparency maintained and increase in heat dissipation performance of the wavelength conversion layer. The air layer eliminates the need to consider heat resistance. Decrease in the wavelength conversion efficiency of the wavelength conversion layer can therefore be suppressed.

In the wavelength conversion element according to the aspect of the invention, the support member may have a non-bonding portion that faces the light transmissive member but is not bonded to the light transmissive member, and the wavelength conversion layer may be disposed in the non-bonding portion.

According to the aspect of the invention with this configuration, the wavelength conversion layer is attached to the light transmissive member via the support member, and the air layer can be formed between the light transmissive member and the wavelength conversion layer.

In the wavelength conversion element according to the aspect of the invention, the support member may have a bonding surface to be bonded to the light transmissive member, and the light incident surface of the wavelength conversion layer may protrude beyond the bonding surface in the direction opposite the direction in which the excitation light travels so that a step is formed between the bonding surface and the light incident surface.

According to the aspect of the invention with this configuration, the light incident surface of the wavelength conversion layer is allowed to be further close to the light transmissive member. The thinner the air layer, the greater the amount of heat transfer. Therefore, the heat from the wavelength conversion layer is allowed to transfer to the light transmissive member via the air layer and is allowed to be dissipated.

In the wavelength conversion element according to the aspect of the invention, the light transmissive member may have sapphire, and the curved surface may have a hemispherical shape.

According to the aspect of the invention with this configuration, since the light transmissive member made of sapphire, which has high thermal conductivity, is provided, heat generated in the wavelength conversion layer can be effectively dissipated via the light transmissive member.

In the wavelength conversion element according to the aspect of the invention, the bonding member may be provided with an air flow port that allows the air layer to communicate with an outside space.

According to the aspect of the invention with this configuration, even when the heat generated by the wavelength conversion layer expands the air layer, the air that forms the air layer can escape through the air flow port to the outside space, whereby separation between the light transmissive member and the support member and other undesirable behaviors can be avoided.

A light source apparatus according to another aspect of the invention includes the wavelength conversion element described above and an excitation light source that emits the excitation light.

According to the aspect of the invention, since the wavelength conversion element that suppresses interface reflection and has high heat dissipation performance is provided, a light source apparatus having high wavelength conversion efficiency can be achieved.

A projector according to another aspect of the invention includes the light source apparatus described above, a light modulator that modulates light outputted from the light source apparatus in accordance with image information to generate image light, and a projection system that projects the image light.

According to the aspect of the invention, a projector including the light source apparatus that excels in wavelength conversion efficiency is provided, and the projector is highly reliable.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

First Embodiment

Projector

A projector according to the present embodiment is an example of a projector using three transmissive liquid crystal light valves as light modulators. The light modulators can each instead be a reflective liquid crystal light valve. Still instead, the light modulators may each be a device using a micromirror, for example, a component using a DMD (digital micromirror device), or a light modulator based on a technology other than the liquid crystal technology.

Figure 1:
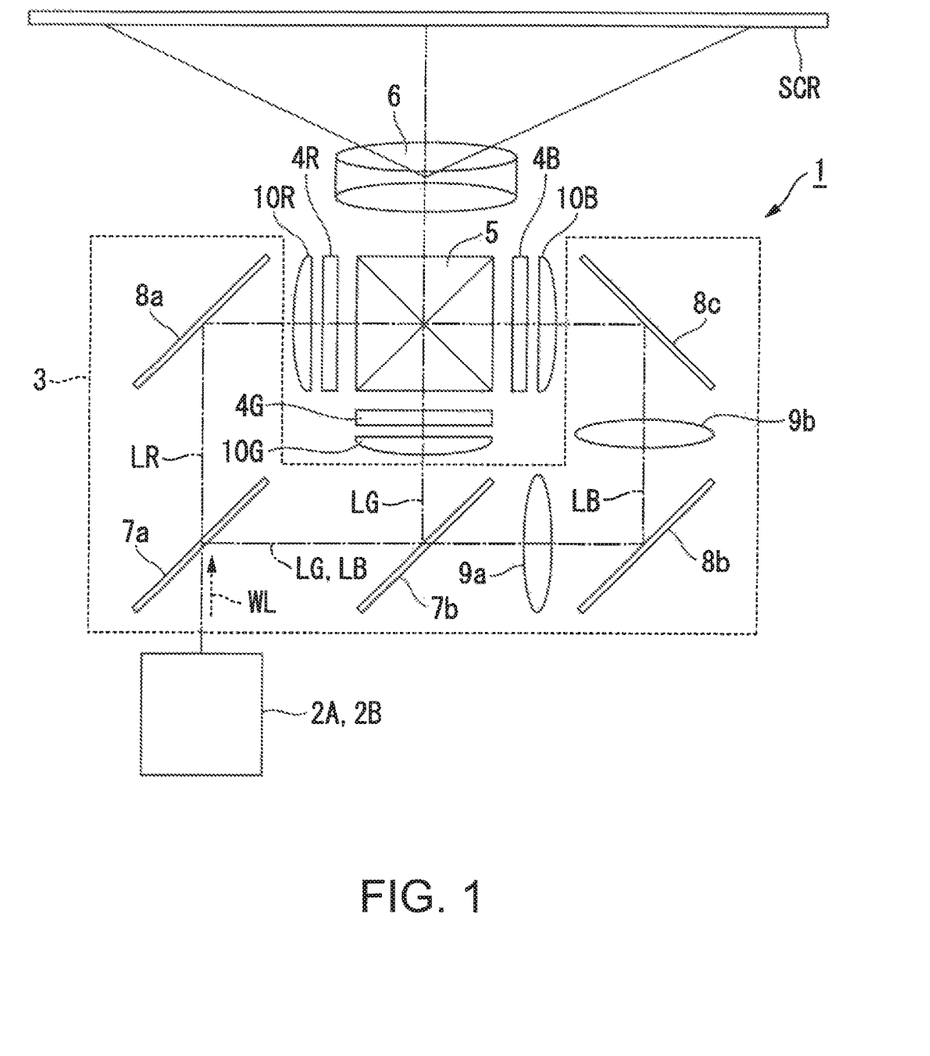
FIG. 1 is a schematic configuration diagram showing a projector according to an embodiment.

FIG. 1 is a schematic configuration diagram showing the projector according to the present embodiment.

A projector 1 includes a light source apparatus 2A, a color separation system 3, a light modulator 4R, a light modulator 4G, a light modulator 4B, a light combining system 5, and a projection system 6, as shown in FIG. 1. The light source apparatus 2A outputs illumination light WL. The color separation system 3 separates the illumination light WL from the light source apparatus 2A into red light LR, green light LG, and blue light LB. The light modulators 4R, 4G, and 4B modulate the red light LR, the green light LG, and the blue light LB in accordance with image information to form image light fluxes of the three colors. The light combining system 5 combines the color image light fluxes from the light modulators 4R, 4G, and 4B with one another. The projection system 6 projects the combined image light from the light combining system 5 toward a screen SCR.

Figure 2:
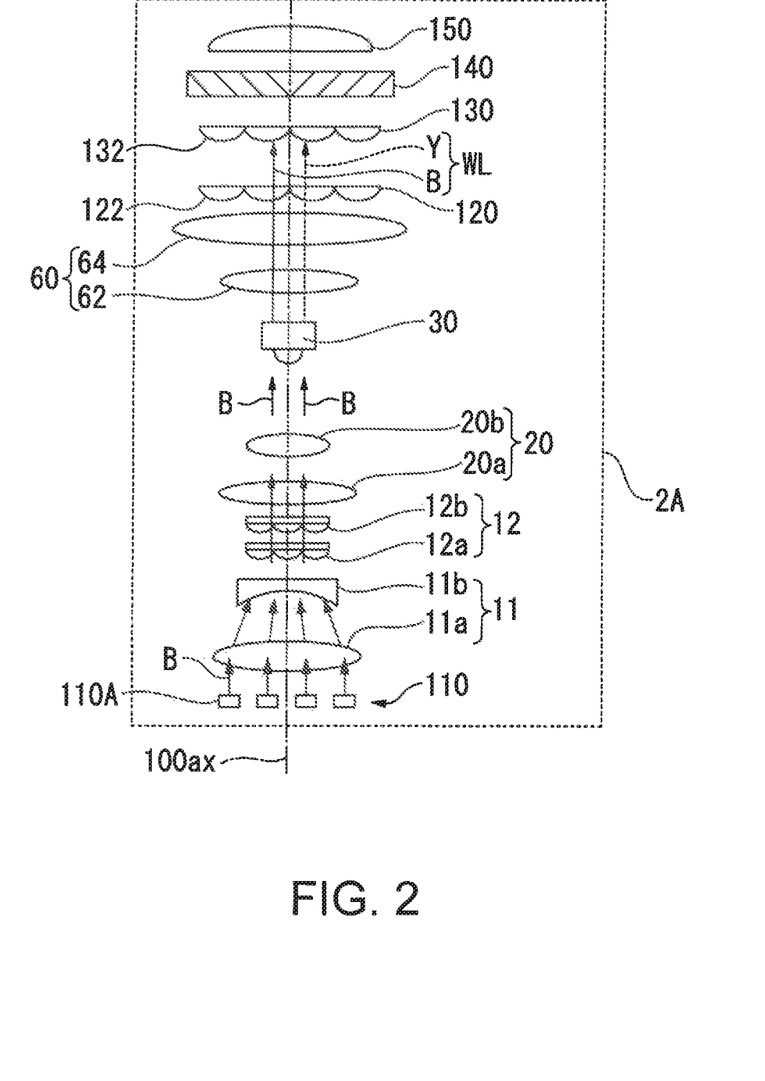
FIG. 2 shows a schematic configuration of a light source apparatus according to a first embodiment.

The light source apparatus 2A, in which semiconductor lasers emit blue excitation light B, outputs white illumination light (white light) WL, which is the combination of a portion that forms the blue excitation light B but has not undergone wavelength conversion and yellow fluorescence Y produced by a wavelength conversion element 30 that performs wavelength conversion of the excitation light, as shown in FIG. 2. The light source apparatus 2A outputs the illumination light WL so adjusted as to have a roughly uniform illuminance distribution toward the color separation system 3. A specific configuration of the light source apparatus 2A will be described later.

The color separation system 3 includes a first dichroic mirror 7a, a second dichroic mirror 7b, a first reflection mirror 8a, a second reflection mirror 8b, a third reflection mirror 8c, a first relay lens 9a, and a second relay lens 9b, as shown in FIG. 1.

The first dichroic mirror 7a separates the illumination light WL outputted from the light source apparatus 2A into the red light LR and light containing the green light LG and the blue light LB mixed with each other. The first dichroic mirror 7a therefore transmits the red light LR but reflects the green light LG and the blue light LB. The second dichroic mirror 7b separates the light containing the green light LG and the blue light LB mixed with each other into the green light LG and the blue light LB. The second dichroic mirror 7b therefore reflects the green light LG but transmits the blue light LB.

The first reflection mirror 8a is disposed in the light path of the red light LR and reflects the red light LR having passed through the first dichroic mirror 7a toward the light modulator 4R. The second reflection mirror 8b and the third reflection mirror 8c are disposed in the light path of the blue light LB and guide the blue light LB having passed through the second dichroic mirror 7b to the light modulator 4B.

The first relay lens 9a and the second relay lens 9b are disposed in the optical path of the blue light LB and in positions downstream of the second dichroic mirror 7b. The first relay lens 9a and the second relay lens 9b compensate optical loss of the blue light LB due to the fact that the optical path of the blue light LB is longer than the optical paths of the red light LR and the green light LG.

The light modulators 4R, 4G, and 4B are each formed of a liquid crystal panel. The light modulators 4R, 4G, and 4B modulate the red light LR, the green light LG, and the blue light LB in accordance with image information when the red light LR, the green light LG, and the blue light LB pass through the light modulators 4R, 4G, and 4B to form image light fluxes corresponding to the three colors. Polarizers (not shown) are disposed on the light incident side and the light exiting side of each of the light modulators 4R, 4G, and 4B.

Field lenses 10R, 10G, and 10B, which parallelize the red light LR, the green light LG, and the blue light LB to be incident on the light modulators 4R, 4G, and 4B, respectively, are provided on the light incident side of the light modulators 4R, 4G, and 4B, respectively.

The light combining system 5 is formed of a cross dichroic prism. The light combining system 5 combines the color image light fluxes from the light modulators 4R, 4G, and 4B with one another and outputs the combined image light toward the projection system 6.

The projection system 6 is formed of a group of projection lenses. The projection system 6 enlarges the combined image light from the light combining system 5 and projects the enlarged image light toward the screen SCR. Enlarged color video images (images) are thus displayed on the screen SCR.

Light Source Apparatus

The configuration of the light source apparatus 2A according to the first embodiment will next be described.

FIG. 2 shows a schematic configuration of the light source apparatus according to the first embodiment.

The light source apparatus 2A includes an excitation light source 110, an afocal system 11, a homogenizer system 12, a light collector system 20, wavelength conversion element 30, a pickup system 60, a first lens array 120, a second lens array 130, a polarization conversion element 140, and a superimposing lens 150, as shown in FIG. 2.

The excitation light source 110 is formed of a plurality of semiconductor lasers 110A, each of which emits the blue excitation light B formed of a laser beam. The intensity of the emitted excitation light B peaks, for example, at 445 nm. The plurality of semiconductor lasers 110A are arranged in an array in a single plane perpendicular to an illumination optical axis 100ax. The excitation light source 110 is not necessarily formed of semiconductor lasers each of which emits light having the wavelength of 445 nm and can instead be formed of semiconductor lasers each of which emits blue light having, for example, a wavelength of 455 nm or 460 nm. Still instead, the excitation light source 110 is not necessarily formed of semiconductor lasers and can be formed of LEDs (light emitting diodes).

The afocal system 11 includes, for example, a convex lens 11a and a concave lens 11b. The afocal system 11 reduces the diameter of the light flux formed of the plurality of laser beams outputted from the excitation light source 110. A collimator system may be disposed between the afocal system 11 and the excitation light source 110 to convert the excitation light to be incident on the afocal system 11 into a parallelized light flux.

The homogenizer system 12, for example, includes a first multiple-lens array 12a and a second multiple-lens array 12b. The homogenizer system 12 achieves a uniform optical intensity distribution or what is called a top-hat distribution of the excitation light on a wavelength conversion layer, which will be described later. The homogenizer system 12, along with the light collector system 20, superimposes a plurality of narrow light fluxes having exited out of a plurality of lenses of the first multiple-lens array 12a and the second multiple-lens array 12b on one another on the wavelength conversion layer. A uniform optical intensity distribution of the excitation light B, with which the wavelength conversion layer is irradiated, is thus achieved.

The light collector system 20, for example, includes a first lens 20a and a second lens 20b. The light collector system 20 is disposed in the optical path from the homogenizer system 12 to the wavelength conversion element 30, collects the excitation light B, and causes the collected excitation light B to be incident on the wavelength conversion layer of the wavelength conversion element 30.

In the present embodiment, the first lens 20a and the second lens 20b are each formed of a convex lens.

The pickup system 60, for example, includes a first collimation lens 62 and a second collimation lens 64. The pickup system 60 is a parallelizing system that roughly parallelizes light having exited out of the wavelength conversion element 30. The first collimation lens 62 and the second collimation lens 64 are each formed of a convex lens.

The first lens array 120 includes a plurality of first lenses 122, which divide the light having exited out of the pickup system 60 into a plurality of sub-light fluxes. The plurality of first lenses 122 are arranged in an array in a plane perpendicular to the illumination optical axis 100ax.

The second lens array 130 includes a plurality of second lenses 132 corresponding to the plurality of first lenses 122 of the first lens array 120. The second lens array 130, along with the superimposing lens 150, forms images of the first lenses 122 of the first lens array 120 in the vicinity of an image formation area of each of the light modulators 4R, 4G, and 4B. The plurality of second lenses 132 are arranged in an array in a plane perpendicular to the illumination optical axis 100ax.

The polarization conversion element 140 converts the light fluxes having exited out of the second lens array 130 into linearly polarized light fluxes. The polarization conversion element 140, for example, includes a polarization separation film and a retardation film (neither of them is shown).

The superimposing lens 150 collects the sub-light fluxes having exited out of the polarization conversion element 140 and superimposes the collected sub-light fluxes on one another in the vicinity of the image formation area of each of the light modulators 4R, 4G, and 4B.

Wavelength Conversion Element

The configuration of the wavelength conversion element according to the first embodiment will next be described.

Figure 3:
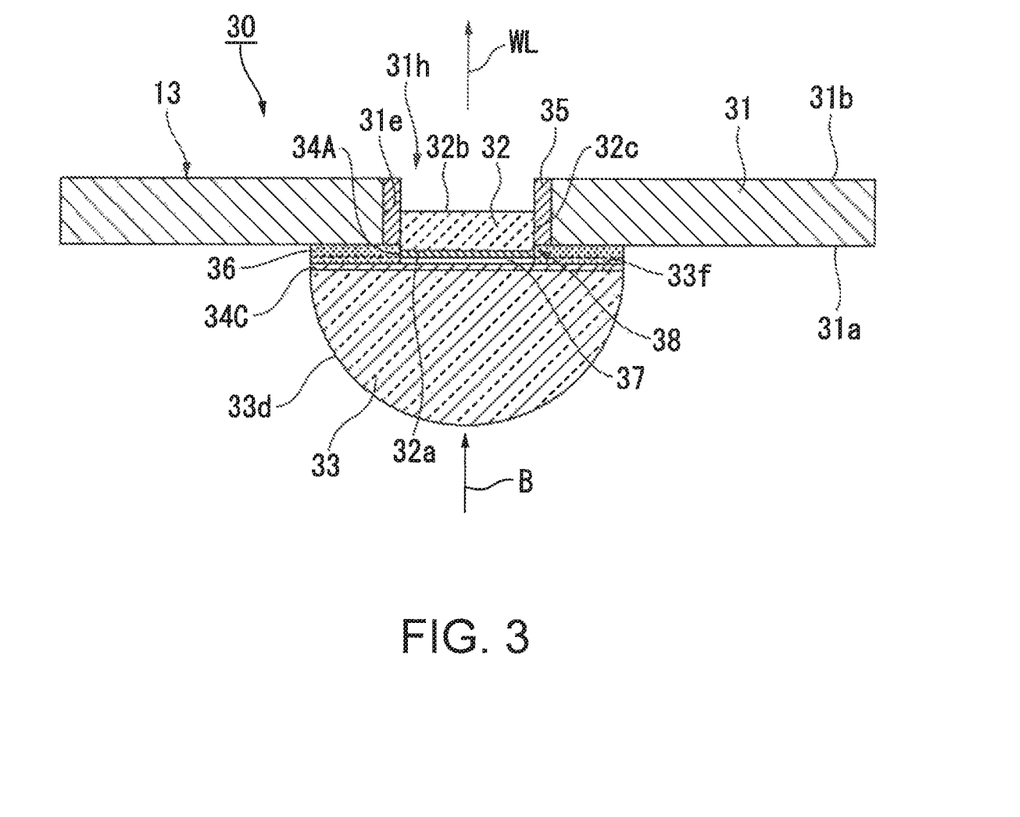
FIG. 3 is a cross-sectional view of a wavelength conversion element according to the first embodiment taken along a plane including an illumination optical axis in FIG. 2.
Figure 4:
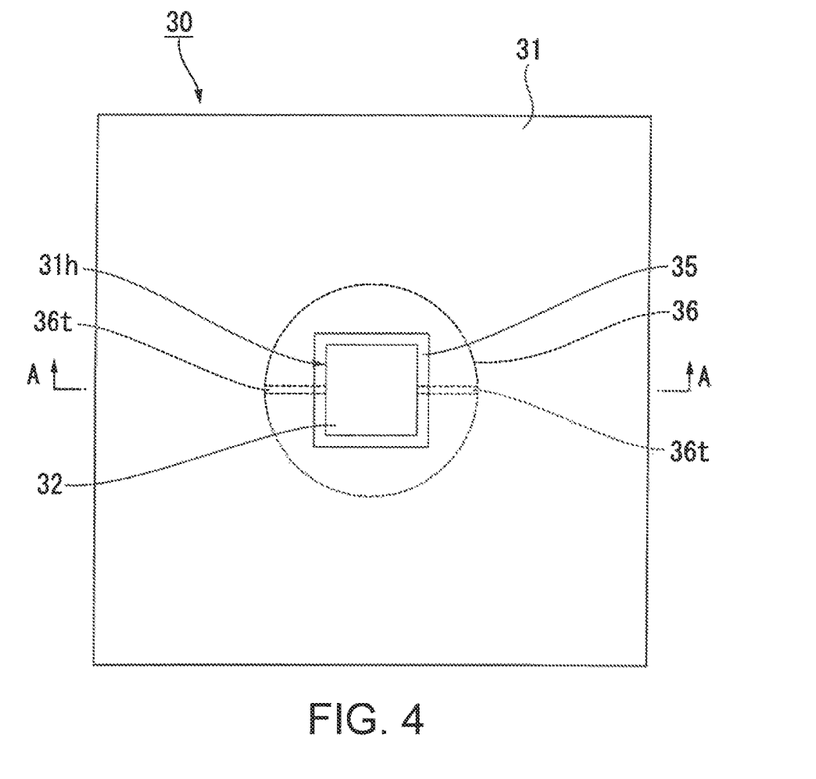
FIG. 4 is a plan view of the wavelength conversion element according to the first embodiment viewed from the side on which excitation light is incident.
Figure 5:
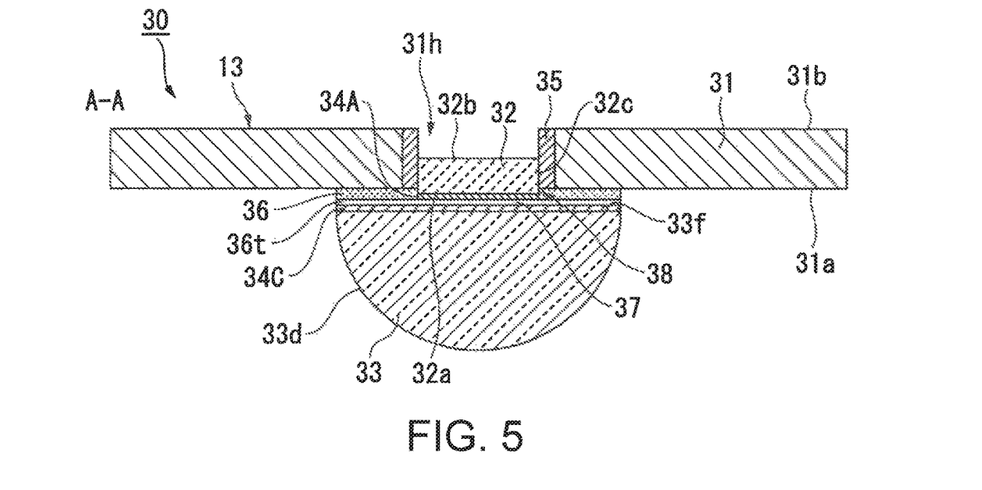
FIG. 5 is a cross-sectional view taken along the line A-A in FIG. 4.

FIG. 3 is a cross-sectional view of the wavelength conversion element 30 according to the first embodiment taken along a plane including the illumination optical axis 100ax in FIG. 2. FIG. 4 is a plan view of the wavelength conversion element according to the first embodiment viewed from the side on which the excitation light B is incident. FIG. 5 is a cross-sectional view taken along the line A-A in FIG. 4.

The wavelength conversion element 30 includes a cooler 13, which includes a support member 31 and a light transmissive member 33, a reflection film 35, a wavelength conversion layer 32, a dichroic film 34A, and an antireflection film 34C, as shown in FIGS. 3 and 4.

The support member 31 is formed of a rectangular plate and has a first surface (bonding surface) 31a and a second surface 31b, which face away from each other in the plate thickness direction. The pickup system 60 is provided on the side facing the second surface 31b of the support member 31. The support member 31 is provided with a hole (non-bonding portion) 31h, which passes through the portion between the first surface 31a and the second surface 31b in the thickness direction. The hole 31h has a rectangular shape when viewed in the direction of a normal to the first surface 31a. The support member 31 may be made of a light transmissive material, such as glass and quartz, or a non-light transmissive material, such as a metal. In the case where the support member 31 is made of a metallic material, it is desirable to use a metal that excels in heat dissipation, such as aluminum and copper.

The reflection film 35 is provided between the support member 31 and the wavelength conversion layer 32. That is, the reflection film 35 is provided on the inner circumferential surface 31e of the hole 31h of the support member 31. The reflection film 35 reflects the fluorescence (yellow light Y) generated in the wavelength conversion layer 32. The reflection film 35 is desirably made of a metallic material having high light reflectance, such as aluminum and silver.

The wavelength conversion layer 32 is provided and supported in the hole 31h of the support member 31. The wavelength conversion layer 32 has a rectangular shape when viewed in the direction of a normal to a light exiting surface 32b of the wavelength conversion layer 32. The wavelength conversion layer 32 contains phosphor particles (not shown) that convert the blue excitation light B into the yellow fluorescence Y and output the fluorescence Y.

The wavelength conversion layer 32 has a light incidence surface 32a, on which the excitation light B outputted from the excitation source 110 is incident and which intersects the optical axis of the excitation light B, a light exiting surface 32b, which faces away from the light incident surface 32a, and a connection surface 32c, which connects the light incident surface 32a and the light exiting surface 32b to each other. The light incident surface 32a is located in a position shifted from the first surface 31a of the support member 31 toward the light transmissive member 33, and the light exiting surface 32b is located in a position shifted from the second surface 31b of the support member 31 toward the interior of the hole 31h. The connection surface 32c is so provided as to be in contact with the reflection film 35, which is provided on the inner circumferential surface of the hole 31h of the support member 31. The light exiting surface 32b may instead be so formed as to be flush with the second surface 31b of the support member 31. The wavelength conversion layer 32 is a transmissive wavelength conversion layer having the light incident surface 32a and the light exiting surface 32b independent of each other.

The phosphor particles are made, for example, of a YAG-based (yttrium-aluminum-garnet-based) phosphor. The phosphor particles may be made of one material or may be a mixture of particles made of two or more materials. The wavelength conversion layer 32 is preferably made of a material that excels in heat resistance and surface processability. The wavelength conversion layer 32 is preferably, for example, a phosphor layer in which phosphor particles are dispersed in an inorganic binder, such as alumina, or a phosphor layer formed of sintered phosphor particles using no binder.

The dichroic film 34A is provided on the light incident surface 32a of the wavelength conversion layer 32. The dichroic film 34A transmits the blue excitation light B outputted from the excitation light source 110 but reflects the yellow fluorescence Y generated in the wavelength conversion layer 32.

The light transmissive member 33 is so provided as to face the light incident surface 32a of the wavelength conversion layer 32 and fixed to the first surface 31a of the support member 31 via a bonding member 36. The light transmissive member 33 in the present embodiment is made of sapphire, which has high thermal conductivity, and formed of a planoconvex lens having a hemispherical cross-sectional shape. The light transmissive member 33 has a flat surface 33f and a convex surface (curved surface) 33d. The flat surface 33f of the light transmissive member 33 faces the light incident surface 32a of the wavelength conversion layer 32 via the dichroic film 34A. The convex surface 33d of the light transmissive member 33 is a curved surface that protrudes in the direction opposite the direction in which the excitation light B from the excitation light source 110 travels.

The antireflection film 34C is provided on the flat surface 33f of the light transmissive member 33. The antireflection film 34C suppresses reflection of the excitation light B, and forming the antireflection film 34C on the flat surface 33f of the light transmissive member 33 allows improvement in the excitation light transmission efficiency of the light transmissive member 33. The antireflection film 34C may not be provided on the entire flat surface 33f. For example, the antireflection film 34C only needs to be provided at least on the portion that forms the flat surface 33f and faces the light incident surface 32a (dichroic film 34A).

The bonding member 36 is disposed between the antireflection film 34C, which is provided on the flat surface 33f of the light transmissive member 33, and the first surface 31a of the support member 31 and bonds the light transmissive member 33 to the support member 31. The bonding member 36 preferably has high thermal conductivity irrespective of whether it is light transmissive or not. For example, the bonding member 36 may be solder or a thermally conductive sheet. The bonding member 36 needs to have a certain thickness for ensuring bonding strength. In the present embodiment, it is preferable that the thickness of the bonding member 36 along the optical axis direction is so set as to be greater than several tens of micrometers, and that the bonding member 36 is thicker than an air layer 37, which will be described later.

An air layer 37 is provided between the light transmissive member 33 and the wavelength conversion layer 32. That is, the air layer 37 is provided between the flat surface 33f of the light transmissive member 33 (antireflection film 34C on flat surface 33f) and the light incident surface 32a of the wavelength conversion layer 32 (dichroic film 34A on light incident surface 32a). In the present embodiment, the light incident surface 32a of the wavelength conversion layer 32 protrudes in the direction opposite the direction in which the excitation light from the excitation light source 110 travels so that the air layer 37 is thinner than the bonding member 36. That is, in the present embodiment, the light incident surface 32a of the wavelength conversion layer 32 is so disposed as to protrude beyond the first surface 31a of the support member 31 toward the light transmissive member 33. A step 38 is therefore formed between the first surface 31a, which is a surface of the support member 31 and to which the light transmissive member 33 is bonded, and the light incident surface 32a of the wavelength conversion layer 32. In the present embodiment, the thickness of the air layer 37 along the optical axis direction is preferably smaller than or equal to 20 µm, more preferably smaller than or equal to 10 µm from the viewpoint of heat transfer.

Minute irregularities may be formed on the flat surface 33f (antireflection film 34C on flat surface 33f) of the light transmissive member 33 or the light incident surface 32a (dichroic film 34A on light incident surface 32a) of the wavelength conversion layer 32. Even if minute irregularities are formed in the flat surface 33f or the light incident surface 32a, arranging the light transmissive member 33 and the wavelength conversion layer 32 in such a way that they are close to each other may cause the flat surface 33f and the light incident surface 32a to be partially in contact with each other but does not cause the dichroic film 34A on the wavelength conversion layer 32 and the antireflection film 34C on the light transmissive member 33 to be in intimate contact with each other with no air layer 37 formed, and the air layer 37 is formed between the light incident surface 32a of the wavelength conversion layer 32 and the flat surface 33f of the light transmissive member 33 or between the dichroic film 34A and the antireflection film 34C.

Therefore, the air layer 37 may be so provided as to have a fixed thickness between the dichroic film 34A and the antireflection film 34C in the state in which the dichroic film 34A and the antireflection film 34C are not in contact with each other but are completely separate from each other, as shown in FIG. 3, or the air layer 37 may be so formed as to have a non-uniform thickness in the state in which the light incident surface 32a of the wavelength conversion layer 32 and the flat surface 33f of the light transmissive member 33 are partially in contact with each other.

The space where the air layer 37 is provided communicates with the space outside the wavelength conversion element 30 via two air flow ports 36t, 36t provided in the bonding member 36, as shown in FIG. 4. The light incident surface 32a of the wavelength conversion layer 32 is heated to a temperature close to about 150° C. When the air layer 37 expands due to the heat generated by the wavelength conversion layer 32, the air that forms the air layer 37 flows through the air flow ports 36t, 36t and is discharged into the space outside the wavelength conversion element 30, whereby separation between the support member 31 and the light transmissive member 33 can be avoided.

The air flow ports 36t are each formed of an area which is between the light transmissive member 33 and the support member 31 and where no bonding member 36 is present. At least one air flow port 36t only needs to be present, and the number of air flow ports 36t and the positions, sizes, and other factors thereof are not limited to those shown in FIG. 4 and are set as appropriate in accordance with the volume and other factors of the air layer 37.

The air layer 37 is light transmissive and eliminates the need to consider suppression of interface reflection and heat resistance. On the other hand, the light transmissive member 33 is bonded to the support member 31, which supports the wavelength conversion layer 32, via the bonding member 36 in a satisfactory manner.

The thinner the air layer 37, the greater the amount of heat transfer. Therefore, in the present embodiment, the air layer 37 is so configured as to be thinner than the bonding member 36. That is, the light incident surface 32a of the wavelength conversion layer 32 is caused to protrude beyond the first surface 31a of the support member 31 toward the light transmissive member 33, so that the wavelength conversion layer 32 is as close as possible to the light transmissive member 33. As a result, the heat from the wavelength conversion layer 32 is likely to transfer not only to the support member 31 but to the light transmissive member 33 via the air layer 37. The cooler 13, which includes the support member 31 and the light transmissive member 33, can improve the heat dissipation performance of the wavelength conversion layer 32 to suppress decrease in the wavelength conversion efficiency of the wavelength conversion element 30.

In particular, in a case where the wavelength conversion layer 32 is not rotated, as in the case of the wavelength conversion element 30, that is, in a case where the wavelength conversion element 30 is not a phosphor wheel, increase in the temperature of the wavelength conversion layer 32 poses a problem. In the present embodiment, the light transmissive member 33 is disposed on the side facing the light incident surface 32a of the wavelength conversion layer 32, and the air layer 37 is provided between the light transmissive member 33 and the wavelength conversion layer 32, whereby the heat from the wavelength conversion layer 32 is likely to transfer not only to the support member 31 but to the light transmissive member 33 via the air layer 37. The cooler 13, which includes the support member 31 and the light transmissive member 33, can improve the heat dissipation performance of the wavelength conversion layer 32 to suppress decrease in the wavelength conversion efficiency of the wavelength conversion element 30.

Further, since the light transmissive member 33 is made of sapphire, which has high thermal conductivity, the heat generated in the wavelength conversion layer 32 can be effectively dissipated via the light transmissive member 33.

In the present embodiment, the air layer 37 communicates with the space outside the wavelength conversion element 30 via the air flow ports 36t, which are provided in the bonding member 36, which bonds the wavelength conversion layer 32 to the light transmissive member 33, whereby the air that forms the air layer 37 flows through the air flow ports 37. As a result, the air (air layer 37) expanded due to the heat generated by the wavelength conversion layer 32 is allowed to flow out via the air flow ports 36t to the space outside the wavelength conversion element 30. Damage of the wavelength conversion element 30 resulting from the expansion of the air layer 37 can thus be avoided.

As described above, according to the configuration in the present embodiment, in which the wavelength conversion element 30 having high heat dissipation performance is provided, the light source apparatus 2A achieved in the present embodiment has high wavelength conversion efficiency, and the projector 1 provided in the present embodiment is highly reliable.

Second Embodiment

A light source apparatus according to a second embodiment of the invention will next be described.

The configuration of the light source apparatus according to the present embodiment that will be shown below differs from the configuration of the light source apparatus according to the first embodiment described above in that a blue-separation-type light source apparatus 2B is provided. Therefore, in the following description, the configuration of the light source apparatus 2B will be described in detail, and the common portions will not be described. Further, in the drawing used in the description, components common to those in FIGS. 1 to 5 have the same reference characters.

Figure 6:
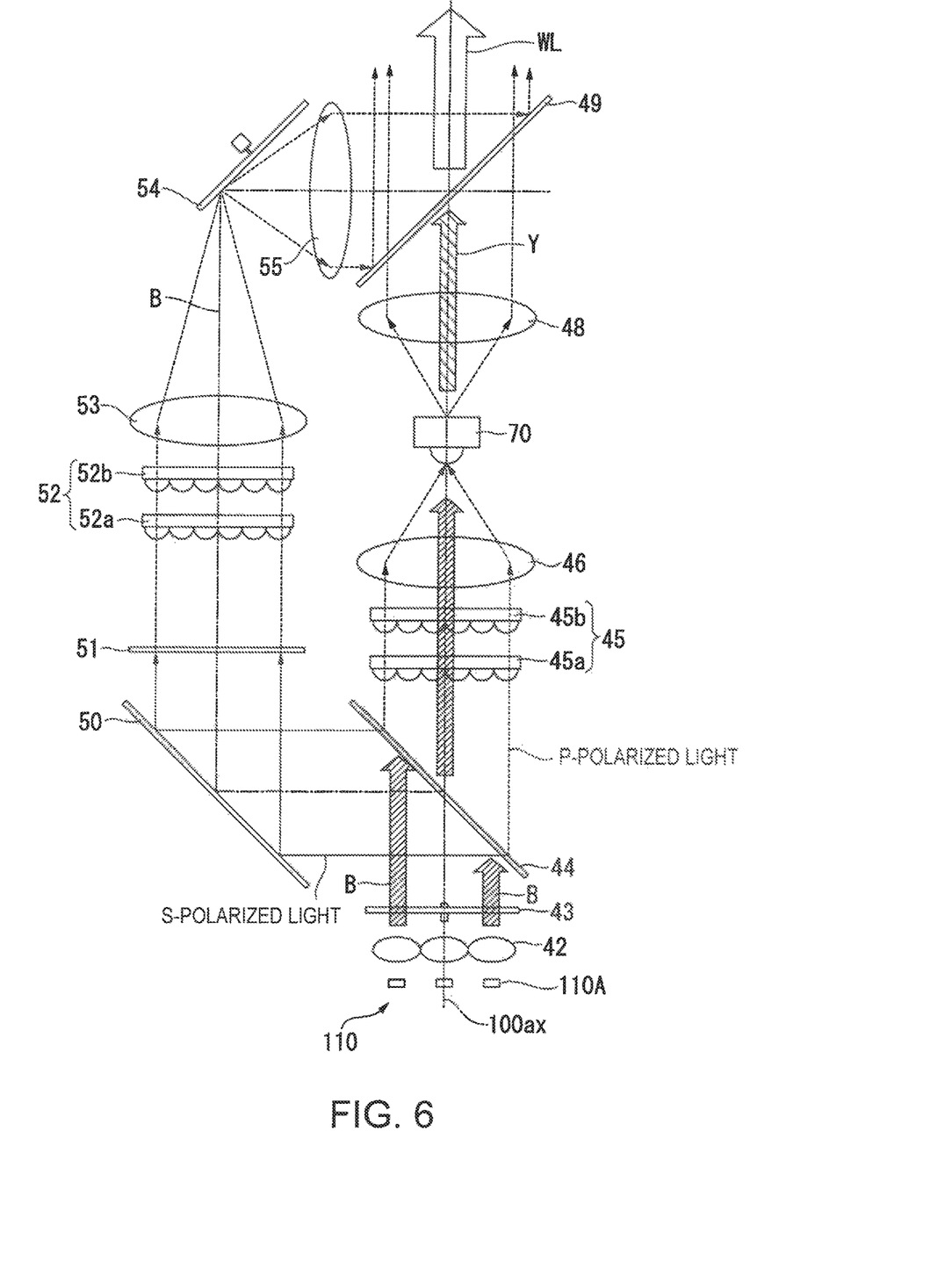
FIG. 6 shows the configuration of a light source apparatus according to a second embodiment.

FIG. 6 shows the configuration of the light source apparatus according to the second embodiment.

The light source apparatus 2B generally includes the excitation light source 110, a collimation system 42, a retardation film 43, a polarization separation element 44, a first homogenizer system 45, a first light collector system 46, a wavelength conversion element 70, a first pickup lens 48, a dichroic mirror 49, a total reflection mirror 50, a second retardation film 51, a second homogenizer system 52, a second light collector system 53, a reflective rotating diffuser element 54, and a second pickup lens 55, as shown in FIG. 6.

Out of the components of the light source apparatus 2B, the excitation light source 110, the collimation system 42, the retardation film 43, the polarization separation element 44, the first homogenizer system 45, the first light collector system 46, the wavelength conversion element 70, the first pickup lens 48, and the dichroic mirror 49 are sequentially arranged along the optical axis 100ax.

The retardation film 43 is formed of a half-wave plate provided with a rotating mechanism. The retardation film 43 converts the excitation light B collected by the collimation system 42 into P-polarized light and S-polarized light combined with each other at an arbitrary ratio. The retardation film 43 may instead be a quarter-wave plate, that is, the retardation film 43 is not limited to a specific component and may be any component capable of changing the polarization state (ratio between P-polarized light and S-polarized light) when rotated or moved.

The polarization separation element 44 is what is called a plate-type polarizing beam splitter (PBS) and has a surface inclining by 45° with respect to the optical axis 100ax. The polarization separation element 44 transmits the P-polarized component of light incident thereon and reflects the S-polarized component of the incident light. The P-polarized component passes through the polarization separation element 44 and travels toward the first homogenizer system 45. The S-polarized component is reflected off the polarization separation element 44 and travels toward the total reflection mirror 50.

The first homogenizer system 45, for example, includes a first multiple-lens array 45a and a second multiple-lens array 45b. The first homogenizer system 45 achieves a uniform optical intensity distribution or what is called a top-hat distribution of the excitation light on a wavelength conversion layer, which will be described later. The first homogenizer system 45, along with the first light collector system 46, superimposes a plurality of narrow light fluxes having exited out of a plurality of lenses of the first multiple-lens array 45a on one another on the wavelength conversion layer. A uniform optical intensity distribution of the excitation light B, with which the wavelength conversion layer is irradiated, is thus achieved.

The first light collector system 46 is disposed in the optical path from the first homogenizer system 45 to the wavelength conversion element 70, collects the excitation light B, and causes the collected excitation light B to be incident on the wavelength conversion layer of the wavelength conversion element 70. In the present embodiment, the first light collector system 46 is formed of a convex lens.

The first pickup lens 48 is formed, for example, of a convex lens and roughly parallelizes the yellow light Y emitted from the wavelength conversion element 70.

The dichroic mirror 49 is a mirror that transmits the yellow light Y emitted from the wavelength conversion element 70, reflects the blue light B incident in the direction perpendicular to the yellow light Y, and causes the reflected blue light B to travel in the optical axis direction in which the yellow light Y travels.

The total reflection mirror 50 is disposed in the optical path of the blue light B and totally reflects the blue light separated by the polarization separation element 44 toward the second retardation film 51.

The second retardation film 51 is a quarter-wave plate ($\lambda/4$ plate). The second retardation film 51 converts the S-polarized blue light reflected off the polarization separation element 44 into circularly polarized light.

The second homogenizer system 52, for example, includes a first multiple-lens array 52a and a second multiple-lens array 52b. The second homogenizer system 52, along with the second light collector system 53, superimposes a plurality of narrow light fluxes having exited out of a plurality of lenses of the first multiple-lens array 52a on one another on the reflective rotating diffuser element 54. A uniform optical intensity distribution of the blue light B, with which the reflective rotating diffuser element 54 is irradiated, is thus achieved.

The second light collector system 53 is disposed in the optical path from the second homogenizer system 52 to the reflective rotating diffuser element 54, collects the blue light B having been converted into circularly polarized light, and causes the collected blue light B to be incident on the reflective rotating diffuser element 54. In the present embodiment, the second light collector system 53 is formed of a convex lens.

The reflective rotating diffuser element 54 diffusively reflects the light rays having exited out of the second light collector system 53 toward the second pickup lens 55. Among such diffusively reflecting components, it is preferable to use, as the reflective rotating diffuser element 54, a component that diffusively reflects light rays incident on the reflective rotating diffuser element 54 in a Lambertian reflection scheme or in a manner close to the Lambertian reflection scheme.

The second pickup lens 55 is formed, for example, of a convex lens and roughly parallelizes the blue light B reflected off the reflective rotating diffuser element 54. The parallelized blue light B travels to the dichroic mirror 49 and is reflected off the dichroic mirror 49 in the direction of the yellow light Y, which travels in the direction perpendicular to the blue light B.

As described above, the light rays (blue light B) reflected off the reflective rotating diffuser element 54 are combined with the fluorescence (yellow light Y) having passed through the dichroic mirror 49, whereby the white illumination light WL is produced. The white illumination light WL is incident on the color separation system 3 shown in FIG. 1.

Wavelength Conversion Element

The configuration of the wavelength conversion element according to the second embodiment will next be described.

Figure 7:
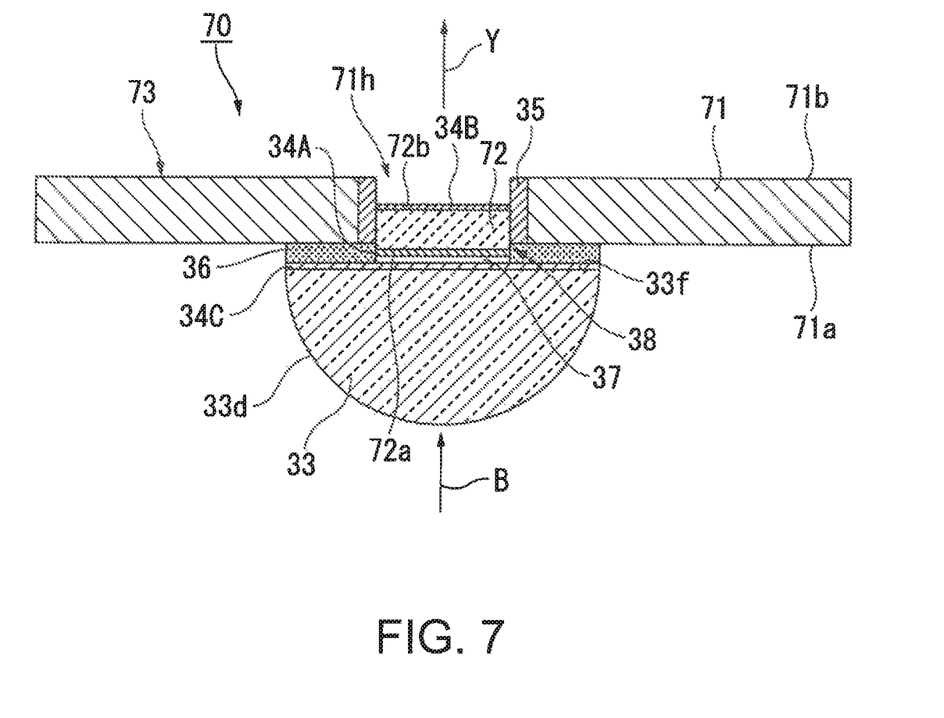
FIG. 7 is a cross-sectional view of a wavelength conversion element according to the second embodiment taken along a plane including an illumination optical axis in FIG. 6.

FIG. 7 is a cross-sectional view of the wavelength conversion element according to the second embodiment taken along a plane including the illumination optical axis 100ax in FIG. 6.

The wavelength conversion element 70 includes a cooler 73, which includes a support member 71 having a hole 71h (non-bonding portion) and the light transmissive member 33, the reflection film 35, a wavelength conversion layer 72, the dichroic film 34A, a dichroic film 34B, and the antireflection film 34C and further includes the air layer 37 between the wavelength conversion layer 72 and the light transmissive member 33, as shown in FIG. 7.

The wavelength conversion layer 72 in the present embodiment is excited with the blue excitation light B radiated from the excitation light source 110 to emit the yellow fluorescence Y. The thickness of the wavelength conversion layer 72 is so set as to be capable of converting the entire excitation light B incident thereon into the yellow light Y.

The dichroic film 34A, which transmits the blue light B but reflects the yellow light Y, is provided on a light incident surface 72a of the wavelength conversion layer 72. The dichroic film 34B, which reflects the blue light but transmits the yellow light, is provided on a light exiting surface 72b of the wavelength conversion layer 72.

Also in the present embodiment, the wavelength conversion layer 72 is so disposed that the light incident surface 72a thereof protrudes beyond a first surface 71a of the support member 71 toward the light transmissive member 33, and the air layer 37 is therefore thinner than the bonding member 36, which bonds the light transmissive member 33 to the support member 71.

As described above, also in the configuration in the present embodiment, the wavelength conversion element 70 achieved in the present embodiment suppresses interface reflection, has high heat dissipation performance, and suppresses decrease in the wavelength conversion efficiency, and the projector 1 provided in the present embodiment allows a brighter projection surface with smaller input electric power.

The preferable embodiments according to the invention have been described above with reference to the accompanying drawings, but the invention is not limited to the examples described above. A person skilled in the art can apparently conceive of a variety of changes and modifications within the category of technical ideas set forth in the appended claims, and it is understood that the changes and modifications, of course, fall within the technical scope of the invention.

The entire disclosure of Japanese Patent Application No. 2016-229802, filed on Nov. 28, 2016 is expressly incorporated by reference herein.

What is claimed is:

1. A wavelength conversion element comprising:
a wavelength conversion layer having a light incident surface on which excitation light is incident and a light exiting surface that faces away from the light incident surface; and
a cooler including a support member that supports the wavelength conversion layer and a light transmissive member that has a curved surface that protrudes in a direction opposite a direction in which the excitation light travels, faces the light incident surface of the wavelength conversion layer, and is bonded to the support member via a bonding member,
wherein an air layer is provided between the light incident surface of the wavelength conversion layer and the light transmissive member,
wherein the light transmissive member includes a flat surface that extends substantially parallel to the light incident surface of the wavelength conversion layer, and
wherein the air layer is thinner than the bonding member.

2. The wavelength conversion element according to claim 1,
wherein the support member has a non-bonding portion that faces the light transmissive member but is not bonded to the light transmissive member, and the wavelength conversion layer is disposed in the non-bonding portion.

3. The wavelength conversion element according to claim 1,
wherein the support member has a bonding surface to be bonded to the light transmissive member, and
the light incident surface of the wavelength conversion layer protrudes beyond the bonding surface in the direction opposite the direction in which the excitation light travels so that a step is formed between the bonding surface and the light incident surface.

4. The wavelength conversion element according to claim 2,
wherein the support member has a bonding surface to be bonded to the light transmissive member, and
the light incident surface of the wavelength conversion layer protrudes beyond the bonding surface in the direction opposite the direction in which the excitation light travels so that a step is formed between the bonding surface and the light incident surface.

5. The wavelength conversion element according to claim 1,
wherein the light transmissive member has sapphire, and the curved surface has a hemispherical shape.

6. The wavelength conversion element according to claim 2,
wherein the light transmissive member has sapphire, and the curved surface has a hemispherical shape.

7. The wavelength conversion element according to claim 3,
wherein the light transmissive member has sapphire, and the curved surface has a hemispherical shape.

8. The wavelength conversion element according to claim 4,
wherein the light transmissive member has sapphire, and the curved surface has a hemispherical shape.

9. The wavelength conversion element according to claim 1,
wherein the bonding member is provided with an air flow port that allows the air layer to communicate with an outside space.

10. The wavelength conversion element according to claim 2,
wherein the bonding member is provided with an air flow port that allows the air layer to communicate with an outside space.

11. The wavelength conversion element according to claim 3,
wherein the bonding member is provided with an air flow port that allows the air layer to communicate with an outside space.

12. The wavelength conversion element according to claim 4,
wherein the bonding member is provided with an air flow port that allows the air layer to communicate with an outside space.

13. The wavelength conversion element according to claim 5,
wherein the bonding member is provided with an air flow port that allows the air layer to communicate with an outside space.

14. The wavelength conversion element according to claim 6,
wherein the bonding member is provided with an air flow port that allows the air layer to communicate with an outside space.

15. The wavelength conversion element according to claim 7,
wherein the bonding member is provided with an air flow port that allows the air layer to communicate with an outside space.

16. The wavelength conversion element according to claim 8,
wherein the bonding member is provided with an air flow port that allows the air layer to communicate with an outside space.

17. A light source apparatus comprising:
an excitation light source that emits the excitation light; and
the wavelength conversion element according to claim 1 on which the excitation light is incident.

18. A projector comprising:
the light source apparatus according to claim 17;
a light modulator that modulates light outputted from the light source apparatus in accordance with image information to generate image light; and
a projection system that projects the image light.

19. The wavelength conversion element according to claim 1, wherein the support member extends longitudinally beyond the surface of the light transmissive member.

* * * * *